United States Patent
Cavaliere et al.

(10) Patent No.: US 9,940,816 B2
(45) Date of Patent: Apr. 10, 2018

(54) PARKING BRAKE WARNING SYSTEM FOR AIR BRAKES

(71) Applicants: Vincent Cavaliere, Fredericksburg, VA (US); John McLaren, Woodford, VA (US); Robin Gene Weaver, Spotsylvania, VA (US)

(72) Inventors: Vincent Cavaliere, Fredericksburg, VA (US); John McLaren, Woodford, VA (US); Robin Gene Weaver, Spotsylvania, VA (US)

( * ) Notice: Subject to any disclaimer, the term of this patent is extended or adjusted under 35 U.S.C. 154(b) by 0 days.

(21) Appl. No.: 14/637,320

(22) Filed: Mar. 3, 2015

(65) Prior Publication Data
US 2015/0248831 A1 Sep. 3, 2015

Related U.S. Application Data

(60) Provisional application No. 61/947,100, filed on Mar. 3, 2014.

(51) Int. Cl.
| | | |
|---|---|---|
| *B60Q 1/00* | (2006.01) | |
| *G08B 21/24* | (2006.01) | |
| *B60T 17/22* | (2006.01) | |
| *B60Q 9/00* | (2006.01) | |
| *G08B 7/02* | (2006.01) | |
| *G08B 7/04* | (2006.01) | |
| *G08B 7/06* | (2006.01) | |

(52) U.S. Cl.
CPC ............. *G08B 21/24* (2013.01); *B60Q 9/002* (2013.01); *B60T 17/22* (2013.01); *G08B 7/02* (2013.01); *G08B 7/04* (2013.01); *G08B 7/06* (2013.01)

(58) Field of Classification Search
CPC .......... B60T 17/22; B60Q 9/002; G08B 21/24
USPC ...................................................... 340/457.3
See application file for complete search history.

(56) References Cited

U.S. PATENT DOCUMENTS

| | | | | |
|---|---|---|---|---|
| 3,651,457 A | * | 3/1972 | Sprouse ................. | B60T 17/22 340/457.3 |
| 5,533,795 A | * | 7/1996 | Brooks ................. | B60T 13/683 303/6.1 |
| 6,322,159 B1 | * | 11/2001 | Eberling ............... | B60T 13/662 303/15 |
| 2008/0224841 A1 | * | 9/2008 | Lundgren ............... | B60T 17/22 340/453 |

* cited by examiner

*Primary Examiner* — Thomas Mullen
(74) *Attorney, Agent, or Firm* — Global Intellectual Property Agency, LLC; Jordan Sworen

(57) ABSTRACT

A warning system for vehicles equipped with air brakes is provided. The present invention provides one or more warning modules in connection with a low pressure switch and a door jamb switch to provide an alert if the driver fails to apply the parking brake and opens the vehicle door. A low pressure switch is connected to an air line controlled by a cabin parking brake switch. When the parking brake switch is toggled on, air is evacuated from the air line and the parking brakes are applied; the low pressure switch is then open. When the air line is pressurized, the parking brake switch is not toggled on and the parking brakes are not applied, causing the low pressure switch to close. If the door jamb sensor registers the driver door is open, the low pressure switch and door jamb sensor complete a circuit, activating the warning modules.

9 Claims, 1 Drawing Sheet

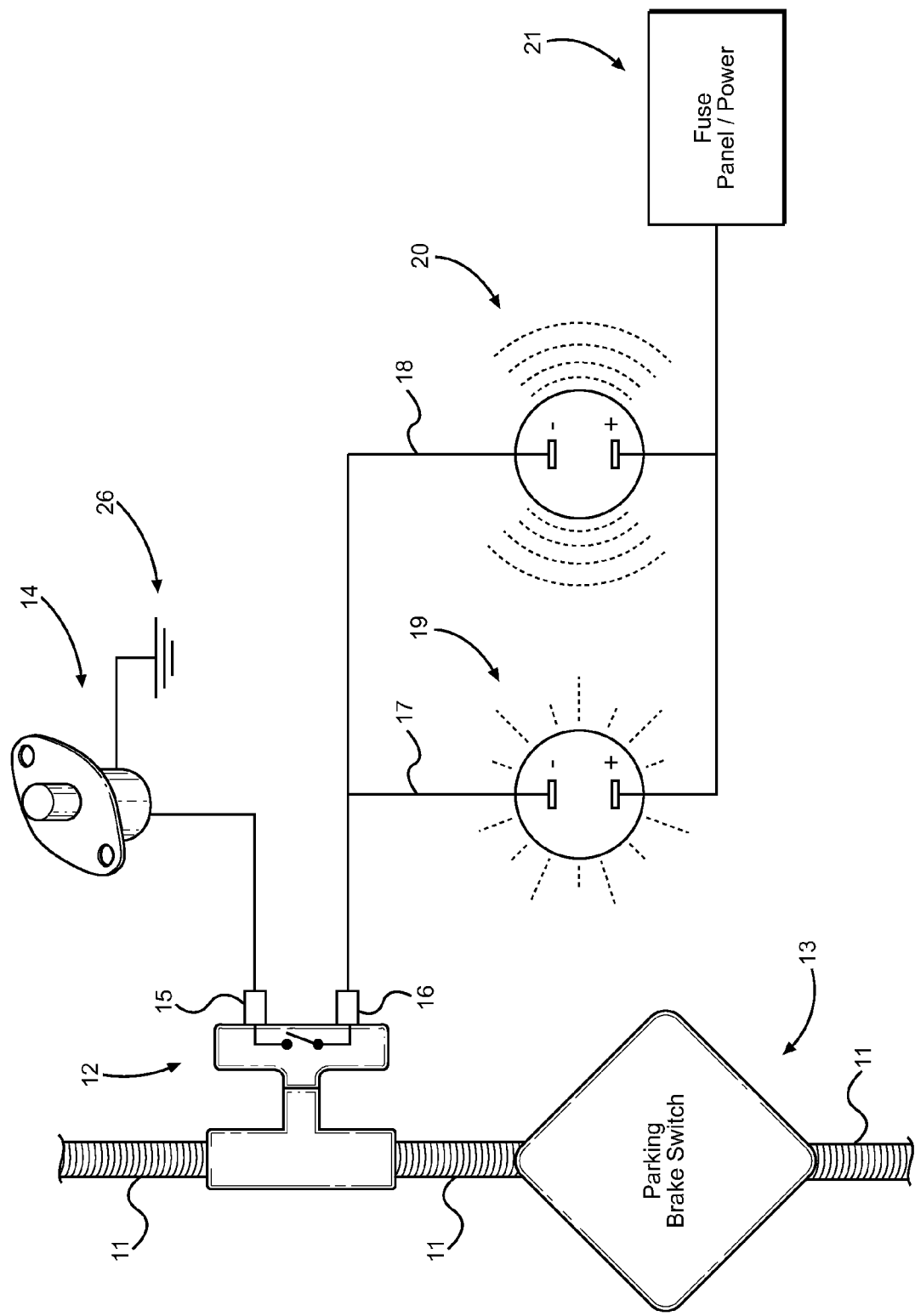

PARKING BRAKE WARNING SYSTEM FOR AIR BRAKES

CROSS REFERENCE TO RELATED APPLICATION

This application claims the benefit of U.S. Provisional Application No. 61/947,100 filed on Mar. 3, 2014, entitled "Air Brake Warning System." The above identified patent application is herein incorporated by reference in its entirety to provide continuity of disclosure.

BACKGROUND OF THE INVENTION

Field of the Invention

The present invention relates to vehicles equipped with air brake systems and warning systems for alerting an operator when the air brake is not applied when leaving the vehicle cab. More specifically, the present invention comprises a system for monitoring the state of the parking brake air line of a vehicle equipped with air brakes and providing the operator with one or more alerts if the parking brake is not applied and the door of the cabin is opened.

Air brake systems are typically provided on large vehicles and heavy trucks. Air brake systems utilize pneumatic pressure rather than hydraulic pressure for several reasons, including safety and efficiency. Air is pressurized in one or more reservoirs on the vehicle and used to move a disc or drum brake disposed on the wheels of the vehicle. Parking brakes generally employ a spring biased configuration in which the air pressure acts against spring force, which normally acts to apply the brakes when not being acted upon by the pressurized air. The pressurized air therefore removes the brake pads from the brake discs, and the spring acts to apply them.

When parking a vehicle equipped with an air brake system, the parking brake is applied by evacuating an air line acting on the brake system, thereby allowing the spring to press the pad or shoe against the disc or drum. When pressurized, the air line forces the pad or shoe away from the disc/drum, thereby releasing the parking brake. Typical truck cabins include a parking brake switch, which when toggled on, evacuates pressure from the parking brake air line and applies the parking brake. The parking brake is a necessary safety feature when parking or leaving the vehicle unaccompanied, thereby preventing unwanted movement when the operator is not in the driver's seat.

Manually applied systems are always prone to human failures and oversights. Where manual toggling of the parking brake switch is required, there exists the chance a vehicle may not be properly secured when the operator leaves the vehicle cabin. Many truck drivers and large vehicle operators are on the road for extended periods of the time, and thus are prone to fatigue, weariness, and distraction. As a result, securing the vehicle using the parking brakes can sometimes be overlooked, which represents a safety risk for those around the truck if left unaccompanied. Toggling the air brake switch on when parked is extremely important for safety. It ensures the truck will not move or roll away unaccompanied. Property damage, serious accidents, and fatalities can occur from improper application of vehicle parking brake.

The present invention provides a new warning system for a vehicle equipped with air brakes and a manually toggled parking brake switch. The system provides at least one alarm module for alerting the operator when the system detects he or she is leaving the cabin and f the parking brake is not applied. The system can be installed on existing vehicles equipped with air brakes, or applied by a manufacturer on the assembly line.

SUMMARY OF THE INVENTION

The following summary is intended solely for the benefit of the reader and is not intended to be limiting in any way. The present invention provides a new warning system for a vehicle equipped with air brakes, wherein the system is utilized for providing a warning alert to an operator of a vehicle when the parking brake of the vehicle is not applied and the operator opens the cabin door.

It is therefore an object of the present invention to provide a new and improved parking brake warning system that has all of the advantages of the prior art and none of the disadvantages.

It is another object of the present invention to provide a parking brake warning system that alerts a vehicle operator if the parking brake has not been applied if the operator fails to toggle the parking brake switch and opens the vehicle door.

Another object of the present invention is to provide a parking brake warning system that includes one or more warning modules, whereby the warning modules may provide an illuminating alert, an audible alert, or equivalent alert for the operator to recognize the parking brake has not been activated when leaving the vehicle.

Yet another object of the present invention is to provide a parking brake warning system that can be installed on any vehicle that has air brakes and utilizes a vacuum line to apply the parking brakes of the vehicle.

Another object of the present invention is to provide a parking brake warning system that is installable on the parking brake air line of an existing vehicle, or alternatively installed at the factory in a production vehicle by an original equipment manufacturer.

Another object of the present invention is to provide a parking brake warning system that includes a low pressure switch and a door jamb switch, whereby both switches are in series and complete a circuit between the warning modules and a power source when the air line is evacuated and the door jamb registers the door is opened.

Another object of the present invention is to provide a parking brake warning system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a system diagram of the present invention.

DETAILED DESCRIPTION OF THE INVENTION

Reference is made herein to the attached drawings. Like reference numerals are used throughout the drawings to depict like or similar elements of the parking brake warning system of the present invention. For the purposes of presenting a brief and clear description of the present invention, the preferred embodiment will be discussed as used for providing an alert to a vehicle operator if the parking brakes have not been applied and the operator opens the vehicle door. The figures are intended for representative purposes only and should not be considered to be limiting in any respect.

Referring now to FIG. 1, there is shown a system diagram of the parking brake warning system of the present invention. The system of the present invention is one that provides an alert to a vehicle operator when the vehicle operator fails to apply the parking brake and opens the vehicle cabin door. The system is operable on vehicles having air brakes, and more specifically on vehicles with parking brakes that are controlled by pneumatic pressure. Large vehicles generally employ air brakes, and parking brakes on these vehicles are generally setup such that the air pressure from the air brake system retracts the brakes from a working position. When the air is applied to the brakes, the brake pads or shoes are withdrawn from the brake discs or drums. This configuration relies on spring-biased application of the parking brake, and air pressure from the air brake system to compress the spring and retract the brakes from a working position. That is, applied to the disc or drum.

The present invention is one that can be installed on existing vehicles or on vehicles on the manufacturing line as an original equipment component. The system functions by tapping into the air line 11 of an air brake system, monitoring the pressure in the air line 11, and operating a circuit that controls the alerts based on the state of the air line 11. The system provides one or more warning modules in the vehicle cabin that are energized when the circuit is closed, whereby the user recognizes a situation when the vehicle is not properly parked and he or she has made a motion to leave the vehicle cabin.

Parking brakes for vehicles with air brakes generally deploy a parking brake switch 13 within the cabin of the vehicle. The user toggles the parking brake switch 13 when he or she wishes to apply or release the parking brakes. Applying the parking brakes is necessary when the operator leaves the vehicle, thereby preventing unwanted motion of the vehicle when the vehicle is parked. The parking brake switch is connected to the air line 11 and is used to pressurize or evacuate air from the air line 11. Pressurizing the air line 11 causes the parking brakes to retract and the wheels to be free, depending on the position of the brake pedal. Evacuating the air line 11 causes a vacuum in the air line 11, thereby allowing the spring-biased parking brakes to extend into a working state to lock specific wheels in place. The user therefore must toggle the switch 13 to apply the parking brakes when the parking brake is necessary.

The system operates first with a low pressure switch 12 that is tapped into the air line 11. The low pressure switch 12 is an assembly that mechanically, pneumatically, electrically, or otherwise responds to the pressure in the air line 11 to open or close a switch therein. The low pressure switch has at least two terminals 15, 16, whereby a switch is disposed between the terminals. The low pressure switch 12 is preferably in an open position when the air line 11 is evacuated, or alternatively when the pressure of the air line 11 is below a given threshold pressure. The threshold pressure is set in the switch 12 to open the switch when the air line 11 is evacuated, and thus when the user has toggled the brake switch 13 to apply the parking brake. Since the parking brake is applied in this condition, the low pressure switch 12 is open and creates a discontinuity in the rest of the circuit, whereby the circuit controls the flow of current from a power source 21 to one or more warning modules 19, 20.

The low pressure switch 12 is therefore a normally open switch, whereby pressure through the air line 11 causes the switch 12 to close, and current to pass from the first terminal 16 to the second terminal 15 thereof. When the parking brake switch 13 is situated such that the parking brakes are not applied, the air line 11 is pressurized. The pressure in the air line 11 thereby causes the low pressure switch 12 to close, creating a closed circuit between the first terminal 16 and second terminal 15. The low pressure switch 12 is configured to respond to the air line pressure when the air line 11 is pressurized, whereby the low pressure switch 12 opens when the parking brakes are applied and closes when the parking brakes are not applied. The exact specifications of the low pressure switch may vary depending on the operating pressure and vacuum in the air line for the given vehicle.

While the preferred embodiment of the pressure switch 12 has been described as a low pressure switch that opens when a low pressure is indicated and closes when a threshold pressure is present, alternate embodiments are contemplated. It is equally contemplated for a system that utilizes high pressure to apply the parking brake for a high pressure switch to be employed. The high pressure switch is one that closes when the pressure in the air line is below a given threshold pressure such that the parking brake is not applied, and opens when the pressure in the air line is above a given threshold pressure, such that the parking brake is applied.

In series with the low pressure switch 12 is a door jamb switch 14. The door jamb switch 14 is one that is positioned within the door of the vehicle, and preferably in the driver's door. The switch 14 is a mechanical, electrical, or equivalent assembly that is adapted to register when the door is positioned within the door jamb. The switch 14 is a normally closed switch that opens when the switch 14 registers the door is in a closed position against the door jamb. When the door is opened and moved away from the door jamb, the door jamb switch closes and allows current to flow therethrough.

The low pressure switch 12 and the door jamb switch 14 are in series with one another and both must be closed in order for current to flow from the power source 21 to ground 25. The present system operates with a negative earth vehicle, whereby current flows from the vehicle electrical system and to the vehicle ground 26. The power source 21 preferably comprises the vehicle battery, whereby the system functions when the vehicle engine is in operation or when the vehicle is turned off. The battery continues to supply current through the system if the switches 12, 14 are both closed. In other embodiments, the power source 21 may also be supplied from the vehicle electrical system that is not directly tied to the battery. The vehicle fuse box may provide suitable electrical connections for either embodiment.

Between the power source 21 and the system switches 12, 14 are one or more warning modules 19, 20. The system contemplates one or more modules that are adapted to provide an alert for the operator as he or she leaves the vehicle cabin, thereby allowing the operator to recognize when the vehicle parking brake is not applied. The modules are in electrical connection with the power source 21 and the system switches 12, 14. More specifically, each individual module is in series with the power source 21 and the pressure switch 12 and the door jamb switch 14. When more than one module is utilized, each module is preferably connected in parallel electrical paths 17, 18 to the other, thereby allowing each module to operate independently in the event one module fails. Alternate configurations place the modules in series with each other.

The warning modules are assemblies having a high and low terminal and assemblies that produce a specific type of alert. Two contemplated modules are an illuminated module 19 and an audible module 20. The illuminated module 19 provides a visual alert in the form of an illuminated lamp, LED, or equivalent light source when current passes through the module 19. The audible module 20 provides an audible alert, such as a buzzer, beeper, or equivalent signal, when current passes through the module 20. The audible and illuminating modules are but two examples that are not intended to be construed as limiting. Alternative modules are contemplated that provide a signal when electrical current is passed therethrough.

The system energizes the one or more modules 19, 20 when the air line 11 is evacuated and when the door jamb switch 14 recognizes the door is ajar. The two switches close, thereby allowing current to flow from the power source 21, through the modules 19, 20, through the switches 12, 14, and to the ground 26. As a result, the operator of the vehicle is provided one or more alerts when the parking brake is not engaged and the door of the vehicle is opened. The modules are preferably mounted on the dash of the vehicle; however their exact location within the vehicle can vary depending on user preference or manufacturing considerations.

The warning system of present invention is one that can be retrofitted to existing vehicles that employ an air brake system. The warning system is provided as a kit to an owner or operator of the vehicle. The user splices the low pressure switch 12 into the supply line of parking brake (e.g. the air line 11), and then mounts the door jamb sensor in the door jamb of the vehicle (preferably the driver's door). The low pressure switch 12 includes a T-shaped fitting or union that allows the pressure switch 12 to be spliced into the existing air line 11, whereby continuity of the air line 11 is maintained and the pressure switch 12 is positioned to receive pressure from the air line. The one or more modules are mounted in the interior of the vehicle cabin, and the switches and modules are connected to a power source on the vehicle. The power source is preferably the battery or a junction in the fuse box of the vehicle providing a constant positive feed of electrical power. Once the system is installed, the modules provide alerts for the vehicle operator when the parking brake is not applied and the chosen door is opened.

When not provided as a kit for retrofitting the system, the system can be installed and designed into a vehicle by an original equipment manufacturer. The system is one that can be wired to the interior portions of a vehicle cabin, thereby allowing deployment of the system without sacrificing space within the cab. The internal wiring provides for the inclusion of modules, which are triggered automatically if the operator forgets to apply the air brake and the door is opened. Overall, the present system provides a useful reminder and a safety feature for new and existing air brake vehicles.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A parking brake warning system for vehicles equipped with air brakes, comprising:
    a parking brake switch connected to an air line that is configured to control a supply of air pressure to a vehicle parking brake for application of the vehicle parking brake;
    wherein activation of the parking brake switch substantially evacuates the air line, and
    deactivation of the parking brake switch pressurizes the air line;
    a low pressure switch connected to the air line, the low pressure switch being closed when the air line is pressurized, and open when the air line is evacuated, the low pressure switch including a T-shaped fitting configured to permit splicing of the low pressure switch into the air line;
    at least one warning module adapted to provide an alert, the at least one warning module being wired in series and in electrical connection with the low pressure switch;
    a power source in electrical connection with the least one warning module;
    a door jamb switch configured to be closed when a vehicle door is open, and open when a vehicle door is closed; and
    a ground;
    whereby the low pressure switch and the door jamb switch are electrically connected in series and are adapted to complete a circuit between the power source, the at least one warning module, and the ground when the low pressure switch and the door jamb switch are both closed.

2. The parking brake warning system of claim 1, wherein the at least one warning module comprises a first module having an audible alert.

3. The parking brake warning system of claim 1, wherein the at least one warning module comprises a second module having a visual alert.

4. The parking brake warning system of claim 1, wherein:
    The at least one warning module comprises a first module having an audible alert and a second module having a visual alert, the first module and the second module being electrically connected in parallel to one another.

5. A parking brake warning system for vehicles equipped with air brakes, comprising:
    a parking brake switch connected to an air line that is configured to control a supply of air pressure to a vehicle parking brake for application of the vehicle parking brake;
    wherein activation of the parking brake switch substantially evacuates the air line, and
    deactivation of the parking brake switch pressurizes the air line;

a pressure switch connected to the air line, the pressure switch being closed when the air line is pressurized, and open when the pressure of the air line is below a given threshold pressure, the pressure switch including a T-shaped fitting configured to permit splicing of the pressure switch into the air line;

at least one warning module adapted to provide an alert, the at least one warning module being in electrical connection with the pressure switch;

a power source in electrical connection with the least one warning module;

a door jamb switch configured to be closed when a vehicle door is open, and open when a vehicle door is closed; and a ground;

whereby the pressure switch and the door jamb switch are electrically connected in series and are adapted to complete a circuit between the power source, the at least one warning module, and the ground when the pressure switch and the door jamb switch are both closed.

6. The parking brake warning system of claim 5, wherein the at least one warning module comprises a first module having an audible alert.

7. The parking brake warning system of claim 5, wherein the at least one warning module comprises a second module having a visual alert.

8. The parking brake warning system of claim 5, wherein:
the at least one warning module comprises a first module having an audible alert and a second module having a visual alert, the first module and the second module being electrically connected in parallel to one another.

9. A kit for installing a parking brake warning system for vehicles equipped with air brakes, comprising:

a low pressure switch adapted to be connected to a vehicle air line, the low pressure switch being closed when the air line is pressurized, and open when the air line is evacuated, the low pressure switch including a T-shaped fitting configured to permit splicing of the low pressure switch into the air line;

at least one warning module adapted to provide an alert, the at least one warning module adapted to be in electrical connection with the low pressure switch;

a door jamb switch configured to be closed when a vehicle door is open, and open when a vehicle door is closed;

wiring and connectors for electrically connecting the at least one warning module to a vehicle power source; and wiring and connectors for electrically connecting the low pressure switch in series with the door jamb switch and a vehicle ground.

\* \* \* \* \*